March 13, 1945. A. H. GERHARDT Re. 22,616

IRONING MACHINE

Original Filed Dec. 6, 1940 5 Sheets-Sheet 1

INVENTOR.
Andrew H. Gerhardt.
BY
A. H. Mahinore
ATTORNEY.

March 13, 1945. A. H. GERHARDT Re. 22,616

IRONING MACHINE

Original Filed Dec. 6, 1940 5 Sheets-Sheet 2

INVENTOR.
Andrew H. Gerhardt.
BY
A. R. Molmore
ATTORNEY.

March 13, 1945. A. H. GERHARDT Re. 22,616

IRONING MACHINE

Original Filed Dec. 6, 1940 5 Sheets-Sheet 3

INVENTOR.
Andrew H. Gerhardt.
BY
A. R. Molinare
ATTORNEY.

March 13, 1945. A. H. GERHARDT Re. 22,616

IRONING MACHINE

Original Filed Dec. 6, 1940 5 Sheets-Sheet 4

INVENTOR.
Andrew H. Gerhardt.
BY
Alf Molmore
ATTORNEY.

March 13, 1945. A. H. GERHARDT Re. 22,616

IRONING MACHINE

Original Filed Dec. 6, 1940 5 Sheets-Sheet 5

INVENTOR.
Andrew H. Gerhardt.
BY
A. W. Molinare
ATTORNEY.

Reissued Mar. 13, 1945

Re. 22,616

UNITED STATES PATENT OFFICE 22,616

IRONING MACHINE

Andrew H. Gerhardt, Skokie, Ill., assignor to Electric Household Utilities Corporation, Chicago, Ill., a corporation of Illinois Original No. 2,362,625, dated November 14, 1944, Serial No. 368,821, December 6, 1940. Application for reissue January 5, 1945, Serial No. 571,400

13 Claims. (Cl. 38—60)

The present invention relates to ironing machines for household use, and more specifically to a power operated type of machine, having a rotary roll, totally supported at one end. More particularly, the present invention is directed to a novel form of ironing machine of the type provided with a relatively small diameter of roll for facilitating and expediting the performance of ironing operations, in a novel manner, on various pieces of wearing apparel and other articles of fabric material.

The ironing machine embodying the present invention is of the general class which is termed a "portable" machine, constructed as a complete, compact, unitary structure of a size and form which lends itself for convenient handling and removal from place to place, and for placement upon suitable supports, or table tops for normal use.

One of the objects of the present invention is to provide, in a machine of the character indicated, a novel and simplified form of driving mechanism which lends itself to compact arrangement within a housing of relatively small cross-sectional dimensions, mounted in upstanding relation on the supporting base of the machine, and which mechanism provides the power driving connections to the roll.

Another object is to provide a novel and simplified form of means for varying the pressure of the shoe against the roll.

A further object is to provide a novel and simplified form of operating connections for moving the shoe into and out of cooperating engagement with the roll and for yieldingly maintaining said shoe in pressure engagement with the roll.

Still another object is to provide a novel form of supporting base for the ironer in which the motor and parts of the driving mechanism may be conveniently housed, and wherein a portion of the support is formed with a chamber to serve as a compartment for storage of the conductor cord, which is used for connection to a source of electrical energy.

Other objects and advantages of this invention will be apparent from the following description taken in connection with the accompanying drawings, in which:

Fig. 4 showing a condition of the mechanism when the roll is stopped and with the shoe out of engagement with the roll; and Fig. 5 showing a condition when the roll is rotating, and the shoe disposed in pressure engagement with the roll.

Figure 4:
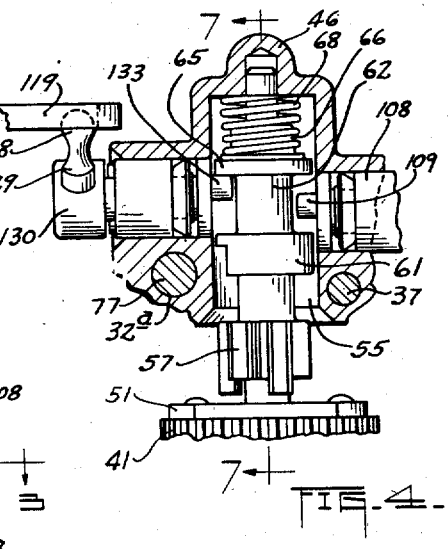
Figs. 4 and 5 are fragmentary sectional views of the clutch mechanism seen in Fig. 3.
Figure 5:
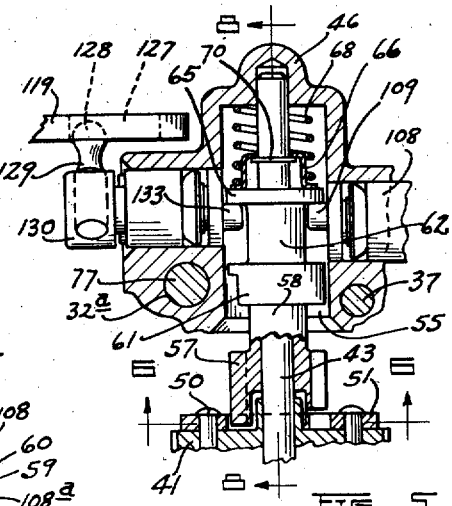
Figure 7:
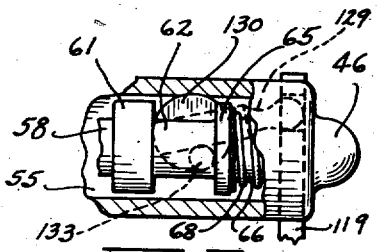
Figure 8:
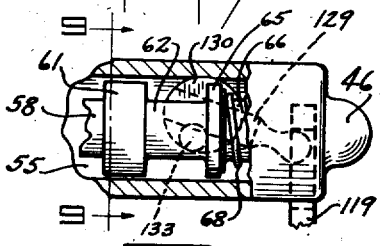

Figs. 7 and 8 are vertical, sectional views, taken at lines 7—7 and 8—8, respectively, on Figs. 4 and 5, showing the different positions of adjustment of the clutch shifting collar.

Figure 9:
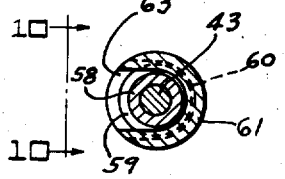

Fig. 9 is a transverse sectional view showing the inner fitting connection between the clutch shifting collar and the movable clutch member, taken substantially as indicated at line 9—9 on Fig. 8.

Figure 10:
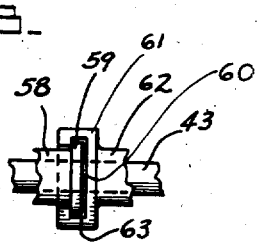

Fig. 10 is an elevational view showing the connection between the clutch shifting collar and the movable clutch member, taken as indicated at line 10—10 on Fig. 9.

Figure 1:
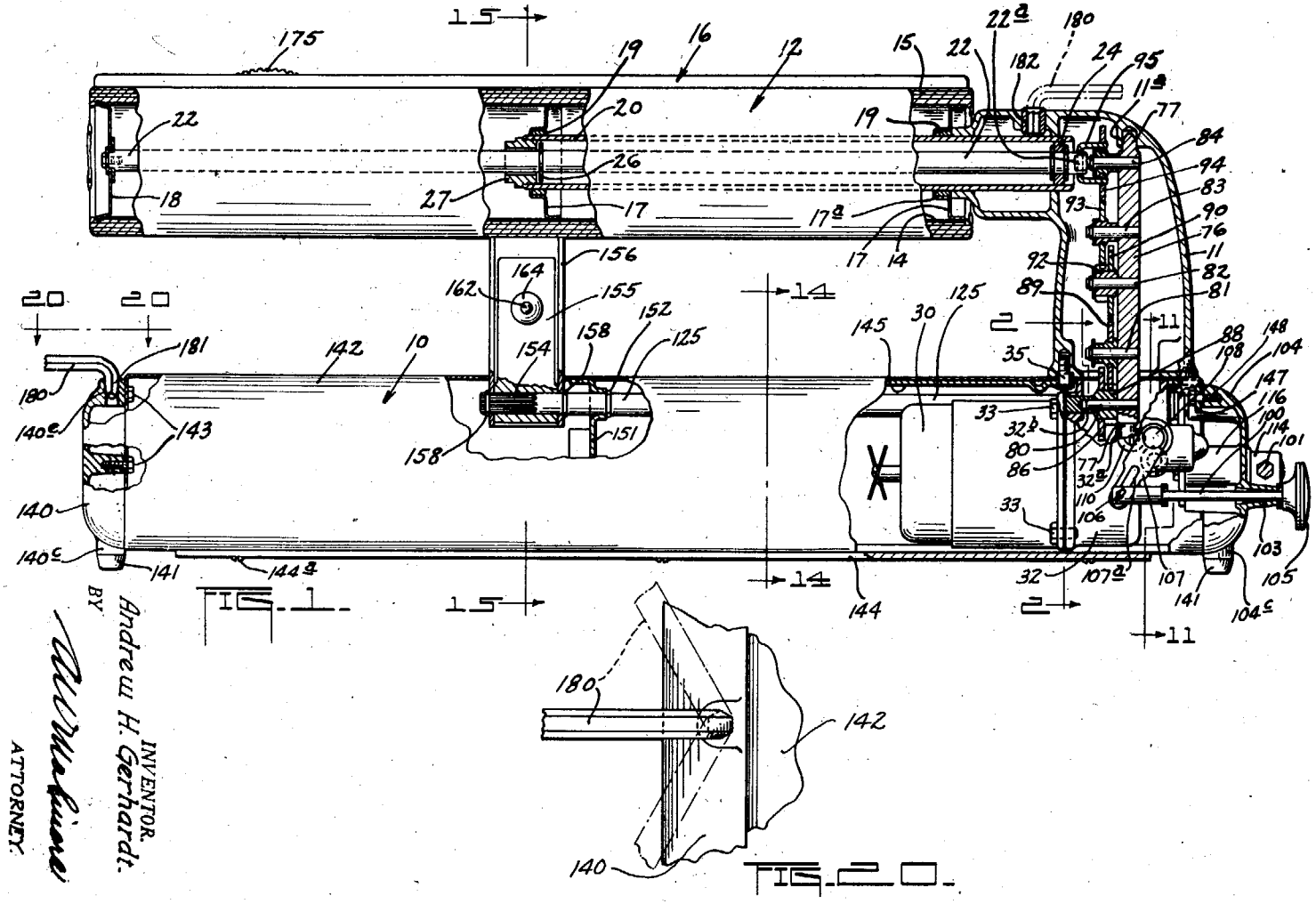
Fig. 1 is a front elevational view of the ironing machine embodying the present invention, with parts broken away and shown in section to illustrate details of construction.
Figure 11:
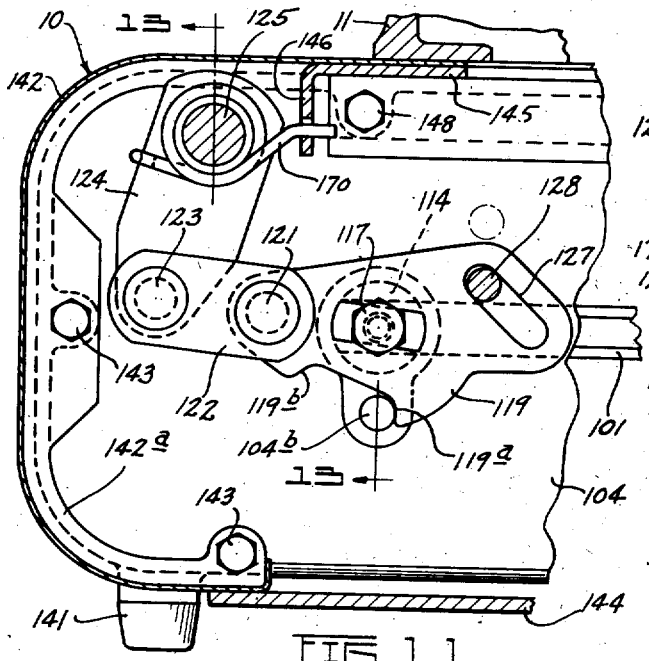

Fig. 11 is an enlarged vertical, fragmentary, sectional view, taken as indicated at line 11—11 on Fig. 1, showing the operating linkage for the rock shaft which controls the movement of the shoe toward and away from the roll, and is shown in a position corresponding to the position of the shoe in pressure engagement with the roll.

Figure 12:
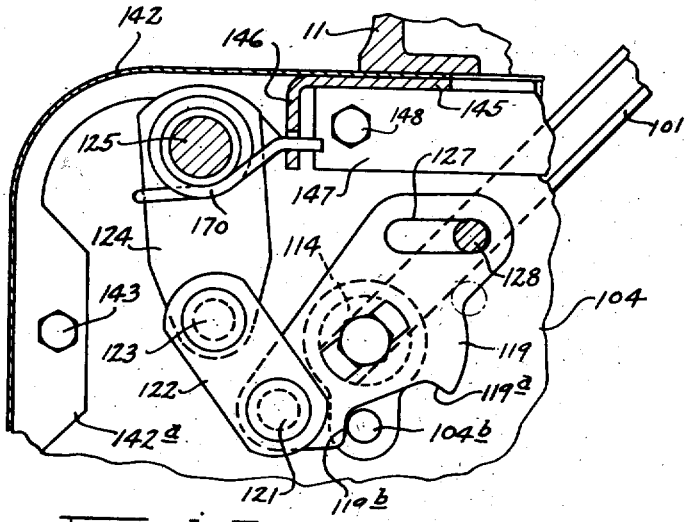

Fig. 12 is a view similar to Fig. 11, showing the linkage in a position corresponding to the position of the shoe backed away or out of engagement with the roll.

Figure 13:
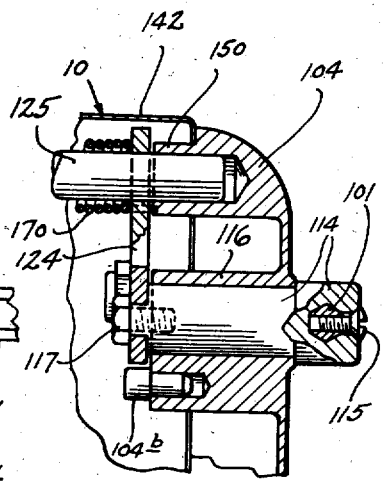

Fig. 13 is a staggered, sectional view taken as indicated at line 13—13 on Fig. 11.

Figure 14:
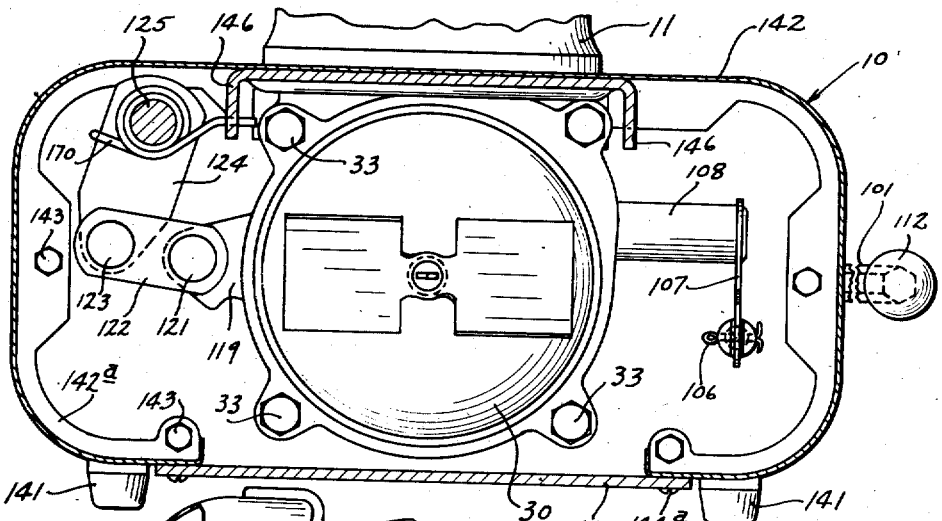

Fig. 14 is a transverse, sectional view through the supporting housing, taken as indicated at line 14—14 on Fig. 1.

Figure 15:
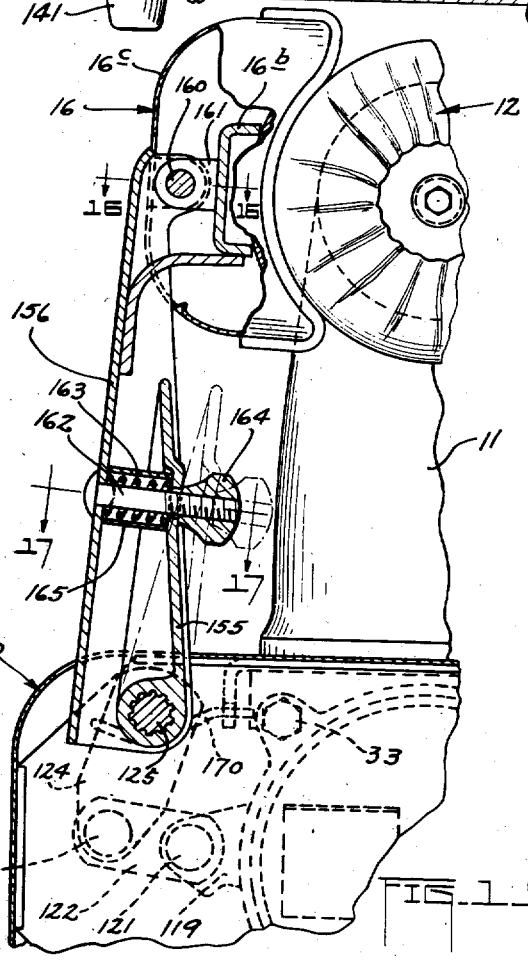

Fig. 15 is a vertical, sectional view through the ironer proper, taken through the shoe support arm, substantially as indicated at line 15—15 on Fig. 1.

Figure 16:
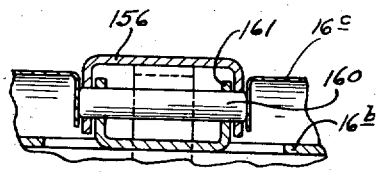
Figure 17:
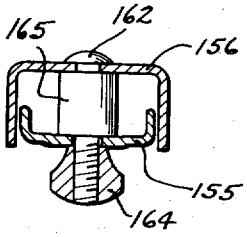

Figs. 16 and 17 are transverse sectional views through the shoe arm support, taken as indicated at lines 16—16 and 17—17, respectively, on Fig. 15.

Figure 18:
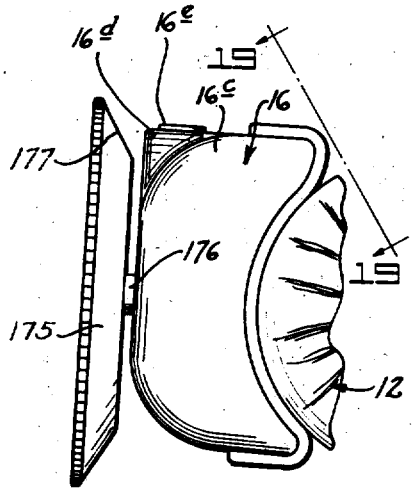

Fig. 18 is an end elevational view of the shoe, showing my novel form of thermostat control member and its relationship to the shoe.

Figure 19:
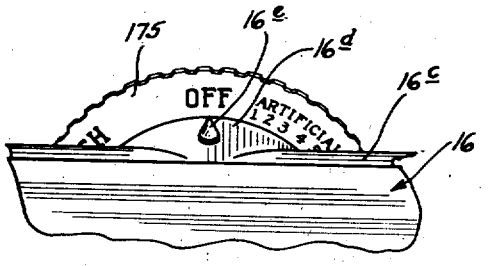

Fig. 19 is a fragmentary view from the face side of the shoe showing the relationship of the thermostat control member to the shoe, taken as indicated at line 19—19 on Fig. 18.

Fig. 20 is a fragmentary plan view showing the auxiliary support arm in an operating position, taken as indicated at line 20—20 on Fig. 1.

Figure 21:
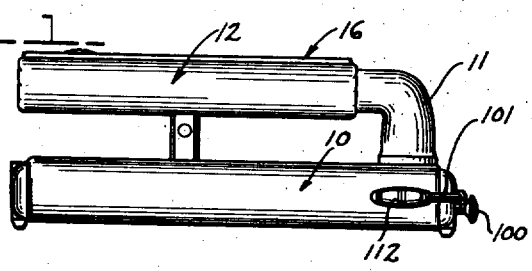

Fig. 21 is an unbroken, small scale, front elevational view of the ironing machine embodying the present invention.

The ironing machine embodying the present invention, as illustrated in the drawings, includes a hollow supporting housing or base 10 of generally rectangular form, at the right hand end of which is mounted an upstanding gooseneck type housing or standard 11, which serves to enclose power drive connections to and support for a rotary roll 12. In the construction illustrated, the housing 11 is a casting and includes an upstanding tubular portion which terminates at its upper end in a horizontally extending tubular portion, and said portions are connected together by suitable curved surfaces. Said housing is so designed that the cross-sectional dimension, taken at any point throughout the length of said housing, is substantially equal to the external diameter of the roll 12.

The roll 12 is of conventional construction, including a tubular metal body 14 around which is wrapped suitable padding material 15, which is surrounded by a fabric wrapper or cover. The outside diameter of said padded roll desirably does not exceed 4½ inches, and preferably is in the range of 3½ inches in diameter. Said roll extends horizontally and in parallel spaced-apart relation to the supporting base 10, and is totally supported at one end by the horizontal portion of the gooseneck housing 11 in a conventional manner. By virtue of the relative diameter of the roll and the size of said housing 11, it is now possible to properly and efficiently iron various articles of wearing apparel in a comparatively simple and expeditious manner, not heretofore possible on previous types of domestic ironing machines provided with conventional large diameter rolls. Cooperating with said roll 12 is a shoe 16, which is preferably electrically heated in a manner well understood in the art. The operating face of the shoe is shaped to the contour of the padded roll 12, and is mounted for manual movement into and out of pressure engagement with said roll, as will hereinafter be more particularly described.

The metal tubular portion 14 of the roll is provided at opposite ends and at substantially centrally of its length, with dish-shaped stampings 17 and 18. Said dish-shaped stampings 17 are provided with centrally offset portions 17ª, formed to enclose bearings 19 which are supported on a piece of metallic tubing 20. Said tube 20 extends beyond the end of the roll, adjacent the housing 11, and is press fitted into said horizontal portion of said housing, at two horizontally spaced-apart points, as seen in Fig. 1 of the drawings. It is by virtue of this construction that said tube, which is carried by the housing 11, provides journal support for the roll 12. The dished member 18 at the free end of the roll is formed for an interfitting driving connection to a roll drive shaft 22, which extends centrally and longitudinally of the roll and through the tube 20 into the housing 11 for connection to the driving mechanism, and serves to impart driving motion to the roll 12. The end of said shaft within the housing 11 is provided with an oil seal 24 engaging the inner wall of the tube 20. The shaft is secured in proper position with respect to the roll 12 and tube 20 by a spring collar 26 mounted on the shaft, adjacent the outer end of the tube 20. Threaded into the outer end of the tube 20 is a tubular nut 27 adapted to serve as an abutment shoulder for the collar 26 and thereby preventing outward movement of the shaft with respect to the housing 11.

Figure 2:
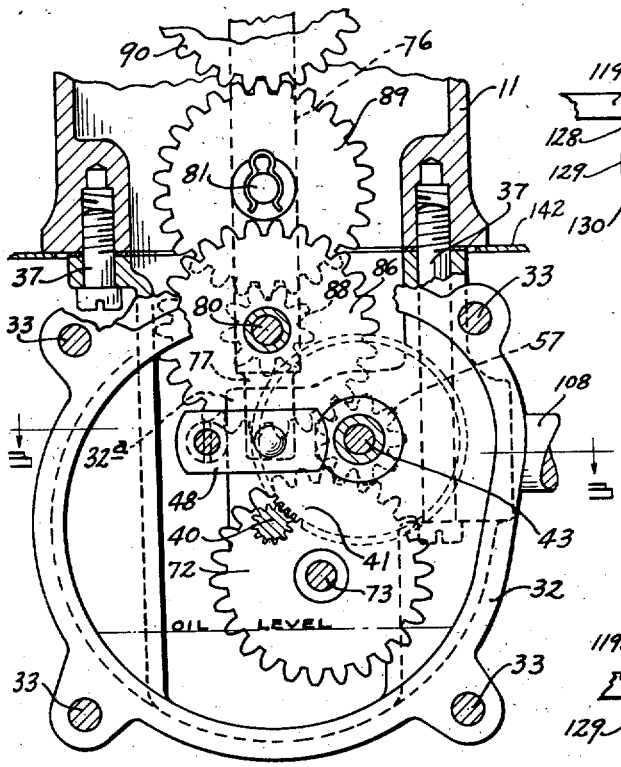
Fig. 2 is an enlarged, vertical, sectional view through part of the driving mechanism, taken substantially as indicated at line 2—2 on Fig. 1.

The driving mechanism for the roll includes an electrically driven motor 30 disposed within the supporting housing 10, and securely connected to a cast housing member 32 by means of machine screws 33. Said housing 32 serves to enclose the lower portion of the driving mechanism and the clutch mechanism below the standard 11. The upper end of housing 32 is formed with an opening for registration with the opening at the bottom of the standard 11, which is also in registration with a similar opening formed in the top of the supporting housing 10, as seen in Fig. 1 of the drawings. The upstanding standard 11 is secured to the top of the supporting housing 10 by means of three circumferentially spaced-apart machine screws 35; and said housing 32 is secured to the standard 11 by two machine screws 37, one of which is of substantial length, as seen in Fig. 2 of the drawings.

Figure 3:
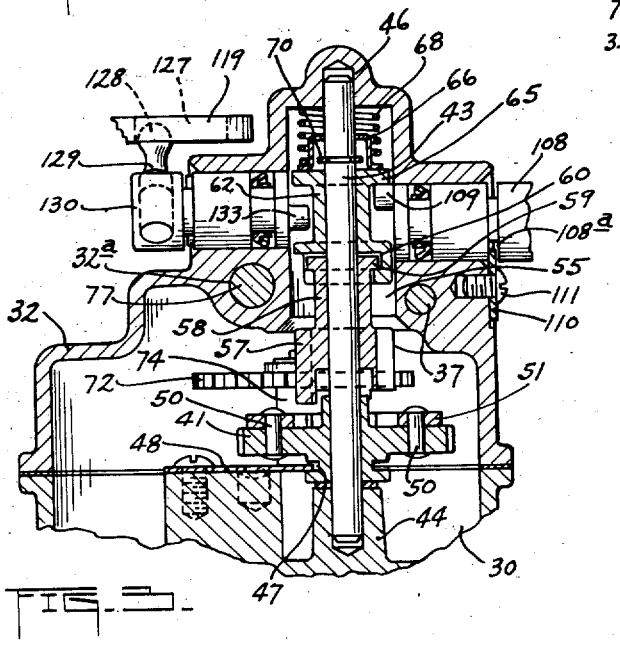
Fig. 3 is a transverse section through the driving mechanism, taken as indicated at line 3—3 on Fig. 2, showing the clutch parts in a position corresponding to a pressing condition of the machine, wherein the shoe is in engagement with the roll and the roll is in stopped condition.
Figure 6:
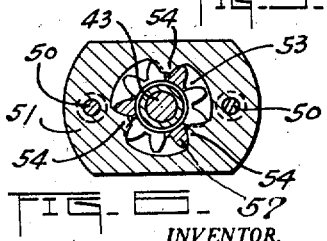
Fig. 6 is a transverse, sectional view through the clutch device, taken substantially as indicated at line 6—6 on Fig. 5.

The motor shaft is provided with a driving pinion 40 meshed with a gear 41 loosely mounted on a shaft 43, one end of which is press-fitted into a boss 44 constituting a part of the motor housing, and the other end is fitted into a boss 46 of the housing 32, as seen in Fig. 3 of the drawings. Said gear 41 has its hub provided with an annular groove 47, into which extends the edge of a plate 48 secured to a boss of the motor housing and which serves to limit axial movement of gear 41 on the shaft 43.

Mounted on the outer face of the gear 41, by means of rivets 50, is a clutch plate 51, which is formed with a central opening 53, the contour of which is such as to provide three circumferentially spaced-apart driving teeth 54. The driving mechanism, to be hereinafter described, is under control of a clutch mechanism which is carried on the shaft 43, and which is disposed within a chamber 55 formed in the housing 32, as seen in Figs. 3 to 5 of the drawings. Cooperating with said clutch plate 51 is an axially shiftable pinion 57 slidably mounted on the shaft 43. Said pinion is formed with three equidistant, circumferentially spaced teeth of greater length than the other teeth, as seen in Fig. 5 of the drawings, so that when said pinion is shifted into operative engagement with the clutch plate 51, said three long teeth are brought into operating contact with the teeth 54 of said clutch plate 51, by virtue of which power is transmitted to the pinion 57. The purpose of forming the clutch plate in the manner indicated and providing only three elongated or extended portions of the teeth of the pinion 57 is to avoid chattering and noise, and insure quick and easy entrance of said extended portions of the teeth into the openings in the clutch plate intermediate the teeth 54, and thereby obtain almost instantaneous clutching and power drive connections. Said pinion 57 at the end opposite the extended teeth is formed with an elongated hub 58, the extreme end of which is formed with an enlarged, annular flange 59 which is adapted to be seated into an annular socket 60 formed in an enlarged flanged shoulder 61 of the clutch shifting collar 62, which likewise is slidably mounted on the shaft 43. Said shoulder 61 is provided with a slot 63, as seen in Figs. 9 and 10 of the drawings, to permit entrance into the socket portion 60 of the flange 59 of the pinion 57. The clutch pinion 57 and the shifting collar 62, together with shaft 43, are assembled by first seating the flange 59 of the pinion 57 into the hollow socket of shoulder 61 of the collar, and then passing the shaft 43 therethrough so as to maintain the parts in coupled relation. The purpose of this connection is to reduce transmission of rotary motion from the pinion 57 to the collar 62 and thereby reduce strain and wear upon the elements which are utilized for effecting shifting of said collar 62.

Mounted in abutting relation with the outer shoulder 65 of the clutch shifting collar 62 is a thimble 66, which is surrounded by a coil spring 68 reacting against the flange of the thimble and against the end of the chamber 55, thereby serving to urge the clutch shifting collar 62 together with the clutch pinion 57 in an inward operating direction. The extent of such inward movement under influence of the spring 68 is limited by a crimped washer 70 monuted in a groove in the shaft 43 in position to be engaged by the closed end of the thimble 66, as seen in Fig. 5 of the drawings.

Mounted beneath the clutch pinion 57 and in mesh therewith is an idler gear 72 loosely mounted on a stud 73 carried in a boss 74 formed as a part of the motor housing. The lower portion of the housing 32 is filled with suitable lubricant, preferably in the form of oil, the level of which, as indicated in Fig. 2 of the drawings, is sufficiently high so that the gear 72 continuously travels through the bath of oil and picks up same and transmits it to the clutch pinion 57 and thence to the driving mechanism (hereinafter described) and serves as a medium for lubricating said driving mechanism.

The gearing thus far described provides a speed reduction from the motor to the pinion 57 when the latter is engaged with the clutch plate 51. A further reduction is obtained by mechanism which will now be described and which serves as the medium for transmitting motion to the roll drive shaft 22. Said mechanism is in the nature of a unitary gearing assembly and includes a vertically disposed mounting bar 76 extending up into the standard 11 and within the housing 32, as seen in Fig. 1. The opposite ends of the bar 76 are reduced as indicated at 77 and the lower end of the bar is seated in a socket 32[a] in the housing 32, while the upper end of said bar is seated in a socket 11[a] formed in the upper end of said standard 11. Projecting laterally from said bar and rigidly secured thereto are vertically spaced apart, horizontally extending stub shafts 80, 81, 82, 83, and 84. Said stub shaft 80, at its outer end, is seated in a socket 32[b] formed integrally with the housing 32, and serves to properly position said bar 76 with its stub shafts in proper operating relation. Mounted on the stub shaft 80 is a gear 86, meshing with the clutch pinion 57, and rigidly attached to said gear 86 is a pinion 88 with which is meshed a gear 89 loosely mounted on the stub shaft 81. Loosely mounted on stub shaft 82 is another gear 90, meshing with the gear 89. A pinion 92 is rigidly attached to the gear 90 and meshes with a gear 93 loosely mounted on the stub shaft 83, and the latter gear is meshed with a gear 94 loosely mounted on the top stub shaft 84. Rigidly attached to the gear 94 is a coupler member 95 of thimble-like formation, the end of which is formed with a socket in the nature of a slot for receiving a tang-shaped terminal 22[a] formed on the end of the roll drive shaft 22. It will now be apparent that when the clutch pinion 57 is in cooperating engagement with the clutch disc 51, motion is transmitted through the gearing described to the roll drive shaft 22 for effecting rotation of the roll 12. The drive mechanism above described is relatively simple and economical to manufacture and lends itself for embodiment in a compact form which may be conveniently assembled as a unit including the bar 76 and gearing described, permitting utilization of a tubular standard 11 of relatively small cross-sectional dimensions, which is essential for use in conjunction with a relatively small diameter roll 12 for performing ironing operations upon certain articles of wearing apparel in a novel and expeditious manner, not heretofore possible on conventional size rolls of commercially available ironing machines.

The drive connections for the roll, as above mentioned, are under control of the clutch pinion member 57 and the movement of the clutch pinion is subject to a dual control—one by a hand operated plunger 100, which controls rotation of the roll under certain conditions, and the other under control of the hand crank arm 101, which, in addition, also serves to control movement of the shoe 16 into and out of cooperating engagement with the roll 12. The plunger 100 is in the form of a rod slidably mounted in a boss 103 formed integrally with an end casting 104, which constitutes a closure for one end of the supporting housing 10. The outer end of the plunger rod 100 is provided with a convenient knob 105 for grasping by the hand, and the opposite end of said rod is pivotally connected by a cotter pin 106 to a depending crank arm 107, the latter being rigidly secured, as by riveting, to the end of a cylindrical plug 108, the opposite portion of which is journaled in a bearing formed in the housing 32, as seen in Figs. 3 to 5 of the drawings. In view of the fixed direction of movement of the plunger rod 100 and its relation to the crank arm 107, said pivotal connection between the parts is accommodated by an elongated slot 107[a] formed in the lower portion of said arm 107 so as to permit linear movement of the rod 100 to be transmitted to pivotal movement of the arm 107, without binding between the parts.

The cylindrical plug or body 108 is provided at its inner end with a nubbin 109 positioned to be moved into and out of engagement with the flanged shoulder 65 of the shiftable clutch collar 62. The plug body 108 is retained in proper position in the housing 32 by a retaining plate 110 secured by screw 111 to the housing body, with an edge portion of the plate protruding into a groove 108[a] formed in the wall of the plug body, as seen in Fig. 3. When the plunger 100 is withdrawn outwardly with respect to the position seen in Fig. 1, the arm 107 is rocked forwardly to rotate the plug body 108 and thereby moves the nubbin 109 in a direction away from the shoulder 65; and the coil spring 68, exerting pressure on the shiftable clutch collar 62, urges said collar together with the clutch pinion 57 in a direction for causing engagement of the three long teeth of the clutch pinion with the teeth 54 of the clutch plate 51. During such movement, the shoulder 65 of the shiftable clutch collar follows up the movement of the nubbin 109 as it is rotated incident to the rotation of the plug body 108. Such control of the clutch pinion 57 by the plunger 100 is, however, also in turn subject to control by the hand crank 101.

Said hand crank is in the form of a rod normally disposed in an oblique position, as seen in Fig. 12, adjacent the outer wall of end casting 104, and is formed at its free end with a transversely bent portion extending inwardly and forwardly of the machine proper and provided with a convenient handle 112. The other end of said rod 101, forming the crank handle, extends through a rotatable plug 114 to which it is firmly secured by means of a set screw 115, as seen in Fig. 13 of the drawings. Said plug 114 is journaled in a boss 116 extending inwardly from and formed integral with the end casting 104. Rigidly secured to the inner end of the reduced portion of the plug 114, as seen in Fig. 13 of the drawings, by means of a screw 117, is a lever 119 formed as a stamping. One end of the lever is pivotally connected at 121 to a toggle link 122, the opposite end of the toggle link being connected by a pivot 123 to the lower end of a crank arm 124. Said arm 124 is rigidly secured, as by welding, to a rock shaft 125 mounted within and extending longitudinally of the base or housing support 10 adjacent the rear edge. The other end of the lever 119 is formed with an elongated slot 127, into which extends a terminal portion 128, in the form of a spherical knob, which constitutes the end of an arm 129 which is rigidly secured to a plug body 130. Said plug body is also journaled in the housing 32 at the side directly opposite the plug body 108, as seen in Fig. 3 of the drawings. Said plug 130 is retained against axial movement in the housing 32, but permitted rotative movement therein by a retaining plate similar to that associated with plug 108.

When the shoe 16 is disposed out of engagement with the roll, the operating crank arm 101 is normally disposed in oblique position, as seen in Fig. 12, and when the shoe is moved into engagement with the roll, said crank arm 101 assumes a position extending substantially horizontally, as seen in Fig. 11. Such movement of the crank arm also controls the clutch shifting collar 62. This is effected by means of a nubbin 133 on the inner end of the plug 130, which is positioned to encounter the shoulder 65 of said shifting collar 62. When the shoe is in engagement with the roll, the nubbin 133, through lever 119 and arm 129, is moved from the position seen in Fig. 4 to the position seen in Figs. 3 and 5. When the hand plunger 100 is drawn outwardly, effecting rotation of the plug body 108, its nubbin 109 is moved from the position seen in Fig. 3 to the position seen in Figs. 4 and 5. When the hand plunger 100 is in the position seen in Fig. 1 and the hand crank arm 101 is in the position seen in Fig. 12, the roll is stopped and the shoe 16 backed away from the roll, and in this condition the clutch is disengaged and the members which control the clutch assume a position as seen in Fig. 4. When the plunger 100 is withdrawn outwardly to operating position and the hand crank 101 is moved to the position seen in Fig. 11, the shoe is in engagement with the roll 12 and the clutch is operatively engaged for rotating the roll; and the parts which control the clutch, assume the position as seen in Fig. 5 of the drawings. When it is desired to use the machine for pressing operations, that is, where the shoe and roll are brought into operative engagement with each other while the roll remains stationary, then the hand plunger 100 remains in the position seen in Fig. 1 and the hand crank arm is moved from the position seen in Fig. 12 to a position as seen in Fig. 11, and the parts for controlling the clutch driving connections assume a position as seen in Fig. 3 of the drawings.

The supporting housing or base 10 is composed of a pair of end castings, one of which, as above mentioned, is designated as 104, and a similar casting 140 is disposed at the opposite end, and said castings are each provided with a pair of transversely spaced-apart depending bosses 104c and 140c, respectively, into which are mounted resilient plugs or feet 141. Said end castings are connected by a sheet metal housing 142 which, as may be seen in the drawings, is composed of a single sheet of metal bent at opposite edges in a downward direction to form sides, and the lower ends of the sides being bent inwardly and then upwardly to form a reinforcing flange, as seen in Fig. 11 of the drawings. The outer ends of the housing 142 are formed with inturned flanges 142a for securement by screws 143 to the respective end castings 104 and 140. Said housing is substantially enclosed by a bottom panel 144, which is connected by screws 144a to the bottom inwardly extending portions of the housing 142, as seen in Figs. 1 and 14 of the drawings, and thus substantially forms a complete closure for the motor 30 and the mechanism associated therewith and mounted within the housing 10. The top of the housing 142 adjacent the end enclosing the motor 30 and driving mechanism is reinforced by a sheet metal plate 145, which is spot welded to the underside surface of the top of the housing 142. The longitudinal edges of the reinforcing plate 145 terminate in downturned flanges 146 for further stiffening and reinforcing of the top of the housing 142, while the end of the reinforcing plate adjacent the drive mechanism is formed with a downturned flange 147, which is secured by screws 148 to the end casting 104.

The rock shaft 125 is supported at the end adjacent the driving mechanism in a bearing 150 formed integrally with and opening to the inside of the end casting 104, as seen in Fig. 13. The opposite end of said rock shaft is journaled in a bracket 151 spot welded to the underside of the top of the sheet metal housing body 142. Axial movement of the rock shaft 125 is precluded by a spring washer 152 seated in a groove formed in said shaft adjacent the end of the bearing bracket 151, as seen in Fig. 1 of the drawings. The end of the rock shaft beyond the bracket 151 is splined, as indicated at 154, on which splined portion is mounted an upstanding arm 155 constituting a part of the shoe arm support. Surrounding and straddling said arm 155 is a sheet metal arm 156 of U-shaped formation, as seen in Figs. 1 and 15 to 17 of the drawings. The lower end of said arm 156 has its side walls journaled on the rock shaft 125, on opposite sides of arm 155, and is confined in place on said rock shaft by means of spring collars or snap rings 158 extending into grooves formed in said portion of the rock shaft, adjacent the sides of the arm 156. The upper end of the sides of the arm 156 is pivotally connected by means of a pin 160 to a pair of ears 161 formed integrally with the back portion 16b of the shoe 16, normally enclosed by a back plate 16c as seen in Fig. 15 of the drawings, by virtue of which the shoe 16 is pivotally supported so as to permit it to freely accommodate itself to the contour of the roll 12.

The shoe arms 155 and 156 are interconnected by means of a headed rod 162 which, as may be seen in Fig. 15, has the head thereof seated against the outside wall of the arm 156 and the other end extending through arm 155, with a coil spring 163 surrounding said rod and interposed between said arms. The outer end of the screw projecting beyond the arm 155, on the side toward the operator of the machine, is provided with a hand knob 164 so that by rotating the knob 164, the pressure of the spring 163 may be varied and thereby, varies the relationship of the shoe to the rock shaft 125, and by virtue of which the pressure of the shoe when engaged with the roll, as will presently be described, will be correspondingly varied. Surrounding the spring 163 is a sleeve 165, interposed between the respective arms 155 and 156 for limiting their final position of adjustment for obtaining maximum pressure of the shoe 16 against the roll 12. When the knob 164 is threaded outwardly to permit the arm 155 to assume the position indicated in dot-and-dash outline in Fig. 15, the pressure of the shoe 16 against the roll, in operating position, has been greatly reduced. The purpose of providing such a variation in pressure of the shoe against the roll is for adapting the ironing machine for performing a proper ironing operation on various types of fabric materials.

The rock shaft 125 is caused to be rocked for moving the shoe toward and away from the roll by movement of the band crank 101, as above mentioned. It will be apparent that as the hand crank 101 is moved from the position seen in Fig. 12 to the position seen in Fig. 11, motion is directly transmitted to the rock shaft 125 by lever 119, link 122, and lever arm 124. Obviously, when the shoe 16 engages the roll, further movement of the hand crank to the final position seen in Fig. 11 builds up the pressure of contact of the shoe against the roll; and further movement of the rock shaft 125, by hand crank 101, causes the rock shaft to become a torque member, serving to provide the necessary spring tension which constitutes a yielding pressure force for maintaining the shoe in pressure engagement with the roll 12. When the shoe is moved into pressure engagement with the roll, the linkage, including lever 119, toggle link 122, and lever arm 124, assumes a locked position at which the pivot 121 is in line with or slightly above the axes of the pivot 123 and the plug 114 carrying hand crank 101. Thus the shoe is retained in pressure engaging relation to the roll until hand crank 101 is raised to break the toggle lock of the linkage.

In order to arrest the linkage, comprising the lever 119, toggle link 122, and arm 124, at the two different limits of movement desired, which correspond to the position of the shoe in engagement with the roll or backed away from the roll at an inoperative position, the lower edge of the lever 119 is formed with a pair of spaced-apart abutment shoulders 119ᵃ and 119ᵇ so that when the shoe is backed away from the roll to an inoperative position, the linkage assumes a position as seen in Fig. 12, with the abutment shoulder 119ᵇ engaging a stop boss 104ᵇ projecting inwardly from the inside of the end casting 104, as seen in Figs. 11 to 13 of the drawings; and when the crank arm 101 is moved to the position seen in Fig. 11, at which position the shoe has been moved into pressure engagement with the roll, the abutment shoulder 119ᵃ of the lever 119 is brought into engagement with the stop boss 104ᵇ for limiting the movement of the linkage and the pressure transmitted to the rock shaft and shoe arms 155 and 156 for causing the shoe 16 to exert pressure against the roll 12.

It is to be understood that in the movement of the crank arm 101 in downward direction for bringing the shoe into engagement with the roll, the shoe actually engages the roll prior to the time that the abutment shoulder 119ᵃ engages the stop boss 104ᵇ, so that during the travel of the linkage from the position where the shoe first engages the roll until the linkage is arrested by the stop 104ᵇ, the desired pressure is built up for maintaining the shoe in a desired yielding pressure engagement with the roll. To facilitate movement of the shoe away from the roll to inoperative position and for returning the linkage as well as the crank arm 101 to inoperative position, as seen in Fig. 12, I provide a coil spring 170 surrounding the rock shaft 125 adjacent the arm 124, with one end of the spring 170 projecting through an aperture formed in the depending flange 146 of the reinforcing plate 145, and the other end of the spring 170 being bent around the arm 124. It is to be understood that the spring is formed so that when mounted as indicated, a slight pressure is exerted on the linkage when said linkage is in the position seen in Fig. 12; and when the linkage moves to the position seen in Fig. 11, the tension in the spring 170 is gradually increased, building up potential energy for facilitating the return of the parts to the position seen in Fig. 12, and the shoe away from the roll, and thereby reducing the manual effort which would normally be required for performing such operation.

Another novel feature of this invention resides in the provision of a thermostat control for the electrical heating elements of the shoe 16. As above mentioned, said shoe includes a back plate 16ᶜ, formed of sheet metal and which serves to enclose the heating elements in a manner well understood in the art. The upper portion of the housing adjacent the outer end of the shoe, as seen in Figs. 1 and 18 and 19, is formed with an upstanding boss of arcuate formation, as indicated at 16ᵈ, with which is aligned a manually adjustable rotatable thermostat control member 175, journaled on a shaft 176, which, in turn, is connected to a conventional thermostat device mounted within the housing 16ᶜ. The manually adjustable member 175 is of frusto-conical formation so as to provide a face 177, the upper edge of which is exposed above the housing 16ᶜ of the shoe, at an oblique angle corresponding to a plane substantially perpendicular to the normal direction of vision of the operator when seated at the machine for performing the normal ironing operations. Said face 177 of the manually adjustable thermostat member 175 is provided with suitable graduations to indicate definite positions of adjustment of the thermostat corresponding to different temperature ranges for the heat of the shoe 16 for the performance of an ironing operation on various types of fabric material. For convenience of the operator, the face 177 of the control member is designated by suitable wording at areas corresponding to a proper position of adjustment of the member 175 for obtaining a desired temperature of the shoe for ironing a corresponding type of fabric material. For example, the operating face 177 of the thermostat control member may contain designations for artificial silk, silk, rayon, wool, cotton, and linen, and in this same sequence the degree of temperature of the shoe is desirably correspondingly varied. Obviously, the temperature required for ironing of silk is less than that required for the ironing of cotton and linen, etc. To facilitate proper adjustment of the control member 175, the embossed portion 16d of the housing is provided with an upstanding indicating character, as represented at 16e, in the nature of a pointer with which the control member 175 may be aligned for obtaining proper adjustment of the thermostat as may be required. The outer periphery of the member 175 is formed serrated for convenience of the operator so that slight engagement thereof by the finger may effect prompt and easy adjustment of the control member.

In ironing comparatively wide articles, such as bed linen or table linen, it is necessary to fold the article a number of times in order to reduce the total width of the article for passage through the machine. In order to permit the operator to more conveniently perform the ironing operation on such large articles and also to reduce the number of folding operations of the article and obtain ironing of the article by direct engagement of its entire surface with the shoe of the machine, I provide an auxiliary support in the nature of a rod 180, one end of which is formed with a downturned extension or terminal portion 181 which may be seated in a socket 182 formed in the top of the gooseneck housing 11 adjacent the roll, as seen in dot-and-dash outline in Fig. 1 of the drawings. It is to be understood that the dimension of the downturned portion 181 of said rod is such that the upper surface of the main portion of the rod is disposed at substantially the same level as the top surface of the roll 12. Said rod thus serves to support the overhanging portion (extending to the right of the roll and shoe) of a wide piece of bed linen or table linen as it is being ironed. Said auxiliary supporting rod may also be utilized advantageously for supporting articles that have been ironed, and for such use, the downturned portion 181 of the rod is seated in a socket 140e formed in the upper end of the outer end casting 140 which forms a part of the supporting base 10, as seen in Figs. 1 and 20 of the drawings. Desirably, the rod 180 is of polygonal cross-section and, as shown, is of hexagonal form; and it is to be understood that the sockets 182 and 140e are of corresponding shape so as to permit seating the rod in the sockets at any of a number of desired angular positions of adjustment, such as indicated in dot-and-dash outline in Fig. 20. When the rod 180 is not in use, it may be inserted interiorly of the supporting base 10, by sliding through an aperture (not shown) in the end casting 104.

The interior of the supporting base, at the end opposite the drive mechanism, forms a chamber of substantial size and may be used as a storage compartment for an extension cord, which is provided for connection to a convenience outlet for supplying electrical current to the motor 30.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as it may be so limited in the appended claims.

I claim:

1. In a unitary portable ironing machine adapted to be mounted upon a table or stand, the combination of a hollow supporting base, a tubular standard mounted on said base, adjacent one end, a rotatable padded roll supported solely at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, and dual control means for said clutch, including a manually operable member extending through the base and serving to control the drive to the roll, and a separate manually operable member extending through said base and serving to move the shoe into and out of engagement with the roll, and adapted for controlling the clutch when said first mentioned member is in one position of adjustment.

2. In a unitary portable ironing machine adapted to be mounted upon a table or stand, the combination of a hollow supporting base, including a sheet metal body of elongated, inverted, channel shape formation, a pair of end castings rigidly secured to and serving to close the ends of said body, and a panel of sheet material secured to the lower marginal edges of said body, a tubular standard mounted on said base, adjacent one end, a rotatable padded roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, and dual control means for said clutch, including a manually operable member extending through the base and serving to control the drive to the roll, and a separate manually operable member extending through said base and serving to move the shoe into and out of engagement with the roll, and adapted for controlling the clutch when said first mentioned member is in one position of adjustment.

3. In a unitary portable ironing machine adapted to be mounted upon a table or stand, the combination of a hollow supporting base, including a sheet metal body of elongated, inverted, channel shape formation, having the lower marginal edges inturned to form flanges, a panel of sheet material securely attached to said flanges, and a pair of end castings rigidly secured to and serving to close the ends of said body, a tubular standard mounted on said base, adjacent one end, a rotatable paddled roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, and dual control means for said clutch, including a manually operable member extending through the base and serving to control the drive to the roll, and a separate manually operable member extending through said base and serving to move the shoe into and out of engagement with the roll, and adapted for controlling the clutch when said first mentioned member is in one position of adjustment.

4. In a unitary portable ironing machine adapted to be mounted upon a table or stand, the combination of a supporting base; a gooseneck tubular standard mounted on said base, adjacent one end; a rotatable, padded roll supported at one end on the upper end of said standard; a roll drive shaft having a portion extending into said upper end of the standard, a shoe supported by the base and mounted for movement into and out of cooperating engagement with said roll; power mechanism including a motor and speed reducing driving mechanism mounted within said base; a housing enclosing said driving mechanism; transmission mechanism extending up into said standard and serving to operably connect the driving mechanism to the roll, said transmission mechanism constituting a unitary assembly including a vertically disposed mounting bar supported at its lower end in a socket in said housing and its upper end being seated in a socket formed interiorly of the standard, a plurality of vertically spaced-apart, horizontally extending stub shafts mounted on said bar, and an intermeshing train of gears mounted on said shafts; and operator controlled clutch means interposed in said driving mechanism.

5. In an ironing machine, the combination of a supporting base; a gooseneck tubular standard mounted on said base, adjacent one end; a rotatable, padded roll supported at one end on the upper end of said standard; a roll drive shaft having a portion extending into said upper end of the standard, a shoe supported by the base and mounted for movement into and out of cooperating engagement with said roll; power mechanism including a motor and speed reducing driving mechanism mounted within said base; a housing enclosing said driving mechanism; transmission mechanism extending up into said standard and serving to operably connect the driving mechanism to the roll, said transmission mechanism constituting a unitary assembly including a vertically disposed mounting bar supported at its lower end in a socket in said housing and its upper end being seated in a socket formed interiorly of the standard, a plurality of vertically spaced-apart, horizontally extending stub shafts mounted on said bar, and an intermeshing train of gears mounted on said shafts; a coupling member carried by the gear mounted on the uppermost stub shaft, said member being adapted for detachable connection with a cooperatively formed end portion of the roll drive shaft; and operator controlled clutch means interposed in said driving mechanism.

6. In an ironing machine, the combination of a supporting base; a gooseneck tubular standard mounted on said base, adjacent one end; a rotatable, padded roll supported at one end on the upper end of said standard; a roll drive shaft having a portion extending into said upper end of the standard, a shoe supported by the base and mounted for movement into and out of cooperating engagement with said roll; power mechanism including a motor and speed reducing driving mechanism mounted within said base; a housing enclosing said driving mechanism; transmission mechanism extending up into said standard and serving to operably connect the driving mechanism to the roll, said transmission mechanism constituting a unitary assembly including a vertically disposed mounting bar supported at its lower end in a socket in said housing and its upper end being seated in a socket formed interiorly of the standard, a plurality of vertically spaced-apart, horizontally extending stub shafts mounted on said bar, and an intermeshing train of gears mounted on said shafts; the lowermost stub shaft including an extension adapted to be seated in a socket in said housing for holding said unitary assembly in proper alignment; and operator controlled clutch means interposed in said driving mechanism.

7. In an ironing machine, the combination of a supporting base, a gooseneck tubular standard mounted on said base, adjacent one end; a rotatable, padded roll supported at one end on the upper end of said standard; a roll drive shaft having a portion extending into said upper end of the standard, a shoe supported by the base and mounted for movement into and out of cooperating engagement with said roll; power mechanism including a motor and speed reducing driving mechanism mounted within said base; a housing enclosing said driving mechanism; transmission mechanism extending up into said standard and serving to operably connect the driving mechanism to the roll, said transmission mechanism constituting a unitary assembly including a vertically disposed mounting bar supported at its lower end in a socket in said housing and its upper end being seated in a socket formed interiorly of the standard, a plurality of vertically spaced-spart, horizontally extending stub shafts mounted on said bar, and an intermeshing train of gears mounted on said shafts; a gear operably driven by the driving mechanism and dimensioned and positioned to travel through a body of lubricant in said housing for transmitting lubricant to the driving and transmission mechanisms; and operator controlled clutch means interposed in said driving mechanism.

8. In an ironing machine, the combination of a hollow supporting base, a tubular standard mounted on said base, adjacent one end, a rotatable padded roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, said driving mechanism including a shaft, a driving clutch member mounted on said shaft and having a plurality of circumferentially spaced-apart abutment jaws, a driven pinion clutch member axially slidable along said shaft and constantly meshed with the transmission mechanism, said pinion being formed at the end adjacent the driving member with a plurality of circumferentially spaced-apart jaws adapted for disengageable cooperation with the abutment jaws of the driving clutch member, a clutch shifting collar slidably mounted on said shaft and formed to provide a rotatably free interconnection with the driven clutch pinion, and operator controlled means for shifting said collar for moving said driven clutch pinion into and out of engagement with the driving clutch member.

9. In an ironing machine, the combination of a hollow supporting base, a tubular standard mounted on said base, adjacent one end, a rotatable padded roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, said driving mechanism including a shaft, a driving clutch member mounted on said shaft and having a plurality of circumferentially spaced-apart abutment jaws, a driven pinion clutch member axially slidable along said shaft and constantly meshed with the transmission mechanism, said pinion being formed at the end adjacent the driving member with a plurality of circumferentially spaced-apart jaws adapted for disengageable cooperation with the abutment jaws of the driving clutch member, a clutch shifting collar slidably mounted on said shaft and formed to provide a rotatably free interconnection with the drivin clutch pinion, spring means reacting on said collar and serving to urge it along said shaft for moving the clutch pinion into engagement with the driving clutch member, and operator actuated means acting on said collar for controlling the action of said spring means.

10. In an ironing machine, the combination of a hollow supporting base, a tubular standard mounted on said base, adjacent one end, a rotatable padded roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, said driving mechanism including a shaft, a driving clutch member mounted on said shaft and having a plurality of circumferentially spaced-apart abutment jaws, a driven pinion clutch member axially slidable along said shaft and constantly meshing with the transmission mechanism, said pinion being formed at the end adjacent the driving member with a plurality of circumferentially spaced-apart jaws adapted for disengageable cooperation with the abutment jaws of the driving clutch member, a clutch shifting collar slidably mounted on said shaft and formed to provide a rotatably free interconnection with the driven clutch pinion, and dual control means for the clutch means including a manually operable member for controlling the shifting of said collar to control the drive to said roll, and a separate manually operable member for moving the shoe into and out of engagement with the roll and having connections for controlling the movement of said collar and drive to said roll when the first mentioned manually operable member is in one position of adjustment.

11. In an ironing machine, the combination of a hollow supporting base, a tubular standard mounted on said base, adjacent one end, a rotatable padded roll supported at one end on said standard, a shoe supported by the base and mounted for movement into and out of cooperating engagement with said roll, power mechanism including a motor and speed reducing driving mechanism mounted within said base, transmission mechanism extending up into said standard and serving to operably connect the driving mechanism to the roll, clutch means interposed in the driving mechanism, said driving mechanism including a shaft, a driving clutch member mounted on said shaft and having a plurality of circumferentially spaced-apart abutment jaws, a driven pinion clutch member axially slidable along said shaft and constantly meshed with the transmission mechanism, said pinion being formed at the end adjacent the driving member with a plurality of circumferentially spaced-apart jaws adapted for disengageable cooperation with the abutment jaws of the driving clutch member, said jaws of the pinion constituting extensions of certain teeth thereof, a clutch shifting collar slidably mounted on said shaft and formed to provide a rotatably free interconnection with the driven clutch pinion, and operator controlled means for shifting said collar for moving said driven clutch pinion into and out of engagement with the driving clutch member.

12. In an ironing machine, the combination of a rotatable roll member and a cooperating electrically energized shoe member, one of said members being movable into and out of cooperative engagement with the other, said shoe having a thermostat heat control device including a rotatably adjustable hand piece in the form of a disc mounted on the back of said shoe with a portion of its marginal edge projecting upwardly in a position to be readily visible to an operator of the machine for convenient adjustment, the forward marginal portion of the face of said disc being provided with suitable indicia to readily indicate the various positions of adjustment of the thermostat heat control device.

13. In an ironing machine, the combination of a rotatable roll member and a cooperating electrically energized shoe member, one of said members being movable into and out of cooperative engagement with the other, said shoe having a thermostat heat control device including a rotatably adjustable hand piece in the form of a disc mounted on the back of said shoe with a portion of its marginal edge projecting upwardly in a position to be readily visible to an operator of the machine for convenient adjustment, the forward marginal portion of the face of the disc being provided with suitable indicia to designate various positions of adjustment of the thermostat heat control device, and the upper edge of the shoe being provided with an index feature with which said indicia of the disc are adapted to be registered.

ANDREW H. GERHARDT.